(12) United States Patent
Swinehart et al.

(10) Patent No.: US 8,701,500 B2
(45) Date of Patent: Apr. 22, 2014

(54) METHOD AND APPARATUS FOR FIXING STRAINED OPTICAL FIBERS AGAINST CREEP AND TEMPERATURE AND STRAIN SENSORS USING SAID TECHNOLOGY

(75) Inventors: Philip R. Swinehart, Columbus, OH (US); Mokhtar S. Maklad, Westerville, OH (US)

(73) Assignee: Lake Shore Cryotronics, Inc., Westerville, OH (US)

( * ) Notice: Subject to any disclaimer, the term of this patent is extended or adjusted under 35 U.S.C. 154(b) by 0 days.

(21) Appl. No.: 13/309,968

(22) Filed: Dec. 2, 2011

(65) Prior Publication Data
US 2013/0139606 A1 Jun. 6, 2013

(51) Int. Cl.
*G01L 1/24* (2006.01)

(52) U.S. Cl.
USPC .......................................................... 73/800

(58) Field of Classification Search
USPC .......................................................... 73/800
See application file for complete search history.

(56) References Cited

U.S. PATENT DOCUMENTS

| 6,317,555 | B1 | 11/2001 | Maron |
| 6,563,970 | B1 * | 5/2003 | Bohnert et al. ................. 385/13 |
| 6,768,825 | B2 * | 7/2004 | Maron et al. .................... 385/13 |
| 6,776,045 | B2 * | 8/2004 | Fernald et al. .................. 73/705 |
| 6,820,489 | B2 * | 11/2004 | Fernald et al. .................. 73/705 |
| 7,327,907 | B2 * | 2/2008 | Shaibani et al. ............... 385/12 |
| 7,856,888 | B2 | 12/2010 | Fergusion |
| 7,860,363 | B2 * | 12/2010 | Kawasaki ..................... 385/135 |
| 2002/0009279 | A1 | 1/2002 | Maron |
| 2008/0019645 | A1 | 1/2008 | Ikunishi |
| 2008/0085074 | A1 | 4/2008 | Wakahara et al. |
| 2009/0126501 | A1 | 5/2009 | Ferguson |

FOREIGN PATENT DOCUMENTS

| JP | 2003-344670 A | 12/2003 |
| WO | WO 99/44024 A1 | 9/1999 |

OTHER PUBLICATIONS

Notification of Transmittal of the International Search Report and the Written Opinion of the International Searching Authority, or the Declaration mailed Mar. 1, 2013 in International Application No. PCT/US2012/067618 (12 pages).
Written Opinion of the International Preliminary Examining Authority mailed Nov. 25, 2013 in International Application No. PCT/US2012/067618 (8 pages).

* cited by examiner

*Primary Examiner* — Lisa Caputo
*Assistant Examiner* — Octavia Davis-Hollington
(74) *Attorney, Agent, or Firm* — Nixon & Vanderhye P.C.

(57) ABSTRACT

Optical fiber anchors accomplishing low creep confinement or fixing of a section of optical fiber in an assembly compact enough to be used conveniently as an anchor or as an enabling part of a strain or temperature sensor while retaining low optical losses and the original buffer coating to prevent the fiber from being exposed to abrasion and other influences that could lead to breakage. A rigid body is used that is mechanically stiff and hard enough to prevent the fiber from cutting into it or distorting the medium or substrate when subjected to stress, even over a long period of years. Trapping can be accomplished by molding the bent fiber into the substrate or body, adhesively bonding or soldering the optical fiber into a confining curved groove in a body or substrate.

5 Claims, 9 Drawing Sheets

METHOD AND APPARATUS FOR FIXING STRAINED OPTICAL FIBERS AGAINST CREEP AND TEMPERATURE AND STRAIN SENSORS USING SAID TECHNOLOGY

CROSS-REFERENCES TO RELATED APPLICATIONS

N/A

STATEMENT REGARDING FEDERALLY SPONSORED RESEARCH OR DEVELOPMENT

N/A

FIELD

The technology herein relates to optical fiber sensors, and more particularly to optical fiber anchoring structures that trap an optical fiber in a serpentine or other curved/bent but stable and rugged disposition to provide low creep optical fiber anchors and thus lower optical fiber sensor drift.

BACKGROUND AND SUMMARY

When glass or silica (hereafter all referred to as glass) optical fibers are to be used in a mode in which they will be strongly compressed or stretched longitudinally, as a non-exclusive example as a fiber optic strain sensor, the high Young's modulus of the glass and high shear stress, combined with its fragile nature, make it difficult to hold or 'fix' the fiber without slippage ('creep') or breakage, especially in a physically compact manner such as would be demanded of a sensor. Such creep causes a drift in, as a non-exclusive example, the 'zero' reading of a strain sensor based on the well-known fiber Bragg grating (FBG).

Adhesives such as epoxies are frequently used to fasten fibers, but the fiber, if stretched or compressed enough, can either creep through as much as several centimeters of epoxy or the fiber will move with respect to its buffer coating in such a way as to reduce the shear stress between the fiber and its buffer coating, or even separate from its buffer coating, causing a false and/or unstable optical signal.

Said buffer coating is usually applied during the fiber drawing process to protect the otherwise fragile glass. This buffer coating can be a polymer, carbon, metal or any of many materials or combinations of materials that suit the purpose of the user. A glass fiber that has never had its original buffer coating removed or damaged can be termed 'pristine'. In 'pristine' condition, the glass fiber is as strong under stress as can be obtained.

If, as a non-exclusive example, an FBG is entirely or partially coated with adhesive when bonded to another body, a temperature or stress gradient along the adhesive bond can cause the FBG reflection peak to break up into multiple peaks, or 'chirp', thus interfering with an optical signal being unambiguously obtained from the sensor.

Several schemes have been devised in the prior art to overcome this deficiency by providing 'creep free' or low creep' fixing points of a compact length. These include, as non-exclusive examples, creating a lump in the glass by heating the glass fiber to its melting point and moving the two solid parts of the fiber toward each other to form an increase in the diameter of the fiber (a lump in the fiber) with the aim of using the lump to catch and hold the fiber; metalizing and soldering the glass; and a method using the compressive effect of a metal solder in a metal sleeve or other metal structure, to seal the fiber with an organic or inorganic buffer layer interposed between the glass fiber and the metal. The latter method keeps the fiber and its buffer in compression at temperatures below the solder melting point because of the higher expansion coefficient of the metal compared to the glass, maintaining a compression seal cushioned by the buffer material. However, the fiber can still shear away from its buffer coating under the metal. Many high temperature adhesives, such as those marketed by Cotronics, Inc., have been formulated to bind directly to glass. However, these require stripping the buffer layer and the fiber becomes fragile and prone to breakage when bent or otherwise stressed near the bond.

Optical fiber sensors and other devices are often in direct competition with electronic sensors that measure the same measurand. Optical sensors performing the same function as an electrical equivalent are usually the more expensive and may have a much larger, or at least much different, form factor than those of the electronic counterpart, thus putting them at a disadvantage. The counteracting advantages of optical sensors are, as non-exclusive examples, that they are immune to electromagnetic interference, explosion-proof, and can be made of all-dielectric materials that make them compatible with high voltages. These advantages, however, can frequently only be utilized by the user if the optical sensor fits in the space allowed with a similar form factor to those of existing electronic sensors and does not drift with time due to its internal construction.

A description of some of the mechanical and optical properties of glass fibers may be useful. Optical fibers that are bent with small radii (<1 cm) have two liabilities. One is the tensile stress that is developed in the outside edge of the fiber in the plane of the circle. Assuming a 'pristine' fiber with proper buffer layer and lack of damaging abrasion and contaminants present, the bend radius versus the time to fracture for various glass formulations, diameters and buffer coatings is well known, allowing for conditions that include the permeation of moisture and other damaging contaminates. Assuming a 125 micrometer glass diameter fiber in pristine condition with a conventional acrylate or polyimide buffer coating, an illustrative example would be one of bending it in about a 4 mm radius in a low humidity environment, which will produce a time to fracture of about 50 years, while the same fiber bent in about a 1.5 mm radius will fracture within minutes or hours. The other liability of bending fibers is that severe light intensity loss can be suffered, depending on the numerical aperture of the fiber. Several non-exclusive examples of acceptable bend radii for a 360° bend with respect to light loss per 360° loop are: A fiber with a numerical aperture of about 0.35 that can be bent in a radius of about 1 mm with light loss of only a few tenths dB, on the condition that the bend has to be fabricated under enough heating to relieve the stresses; a fiber with a numerical aperture of about 0.16 to 0.2 (known as a bend insensitive fiber) that can be mechanically bent and held in a radius of 3 mm with losses of <0.5 dB; a fiber with a numerical aperture of about 0.09 to 0.11 (common communications fiber, e.g., Corning SMF-28) that will lose significant light with a bend radius as large as 15 mm. Such light losses are illustrated in the data of FIG. 1.

We have surprisingly found that a compact low creep optical fiber fixing or anchoring method can be achieved by trapping the fiber in at least one bend, but preferably a series of bends of 180 degrees or more, in a medium or substrate that has mechanical properties (e.g., stiffness and hardness) to resist or prevent said fiber from cutting into it or distorting it when the fiber is subjected to stress, even over a long period of years. This trapping can be accomplished, as non-exclusive examples, by casting or molding the bent fiber into a substrate or body, adhesively bonding or soldering the optical fiber into a confining curved groove in a body or substrate, or by adhesively bonding, soldering or brazing the fiber into a confining tube, followed by winding of the tube at least at one end of the FBG-containing length into a compact form factor of the type generally described here. Further, the friction between the optical fiber and the at least one confining bend can be enhanced if said bend or bends contain at least one point of inflection in which the curvature of the optical fiber changes direction (i.e., the derivative of a mathematical description of the path of the fiber passes through zero at least once). These non-exclusive examples of structures accomplishing low creep confinement or fixing of a section of optical fiber will be termed herein "fiber anchors" or "anchors", and will necessarily provide for a means of fixing the anchor structure to at least one other body. This novel fixing means allows the use of inexpensive adhesives and has been demonstrated to hold FBG sensors in a stable "zero" condition over a period of several years.

Illustrative technology herein provides a method of fixing or binding optical fibers in an assembly compact enough to be used conveniently as an anchor or as an enabling part of a strain or temperature sensor while retaining low optical losses and the original buffer coating to prevent the fiber from being exposed to abrasion and other influences that could lead to breakage. By low optical losses is meant an insertion loss of less than 1 dB and preferably less than 0.3 dB. A novel method is disclosed herein that traps the fiber in a high friction environment that accomplishes long term creep resistance and yet provides breakage protection while maintaining a compact form factor that is simple and inexpensive. As a non-exclusive example, by compact form factor for a single point strain sensor is meant less than 100 mm in any dimension and preferably less than 75 ×25 mm in the plane of mounting of the strain sensor in order to enhance the placement of the sensor to measure strain at a specific point. This method is of particular benefit with fibers stressed in the longitudinal direction of the fiber, but is also of utility in cases of radial stress or combined axial and radial stresses. The novel and beneficial nature of the technology herein will become evident in the following description.

Further, if two or more of the herein-defined anchors are utilized on either side of an optical sensing element fabricated within the optical fiber, a sensor can be fabricated for the reliable measurement of such strain or vibration that is desired to be determined in a body to which both anchors can be firmly attached. In one non-exclusive example, strain can be used to transduce various parameters such as pressure and vibration to wavelength changes. Similarly, the movement between two different bodies can be measured by attaching one anchor to each of said bodies with an arbitrarily long length of taut optical fiber between them, said fiber containing at least one FBG. For the purposes of this disclosure, "an Optical Sensing Element" is defined to include at least one of a fiber Bragg grating (FBG), a Fabry-Perot etalon, a Mach-Zehnder interferometer or other interferometric optical device.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 10 shows an illustrative method of fabricating a dual strain and temperature sensor utilizing at least two fiber Bragg gratings that each possess different responses to temperature and/or strain so accurate strain and temperature can be solved for.

DETAILED DESCRIPTION

Figure 1:
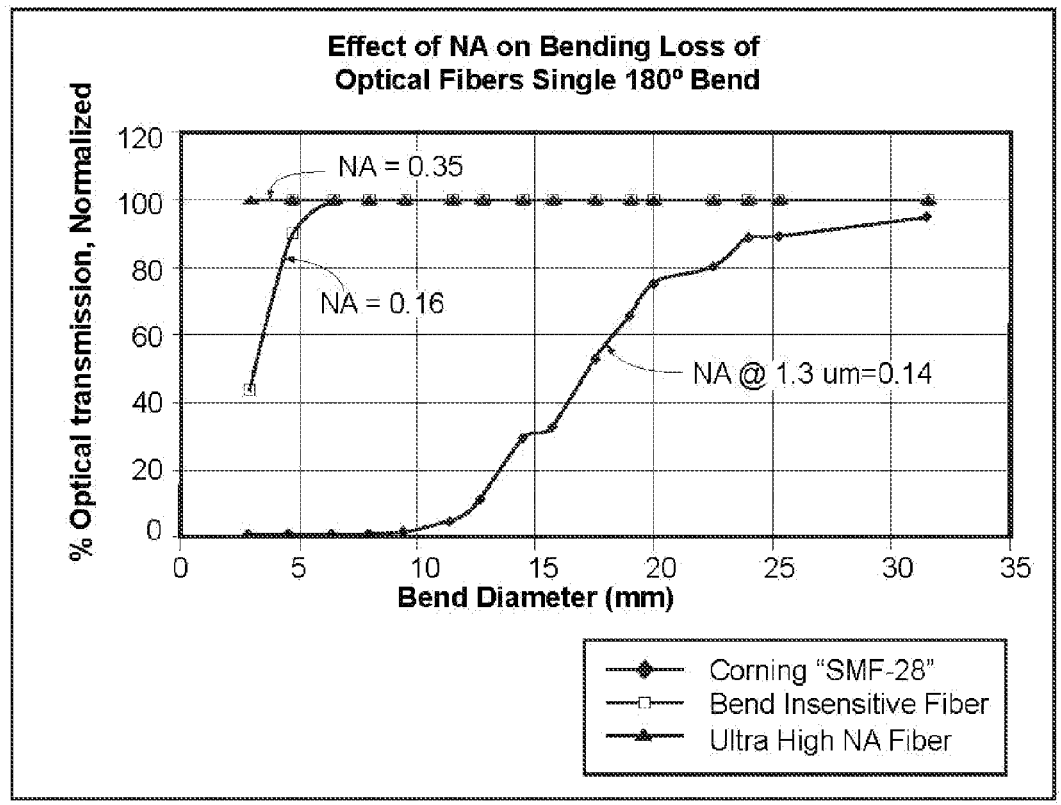
FIG. 1 shows example optical power losses from optical fibers of the same glass diameter and similar buffer coatings, but different numerical apertures.

FIG. 1 shows illustrative data demonstrating the deleterious effect of low numerical aperture on the optical fiber bending loss, illustrating a particular fiber's suitability for a compact anchor form factor of the dimensions advantageous for use in a sensor.

Figure 2:
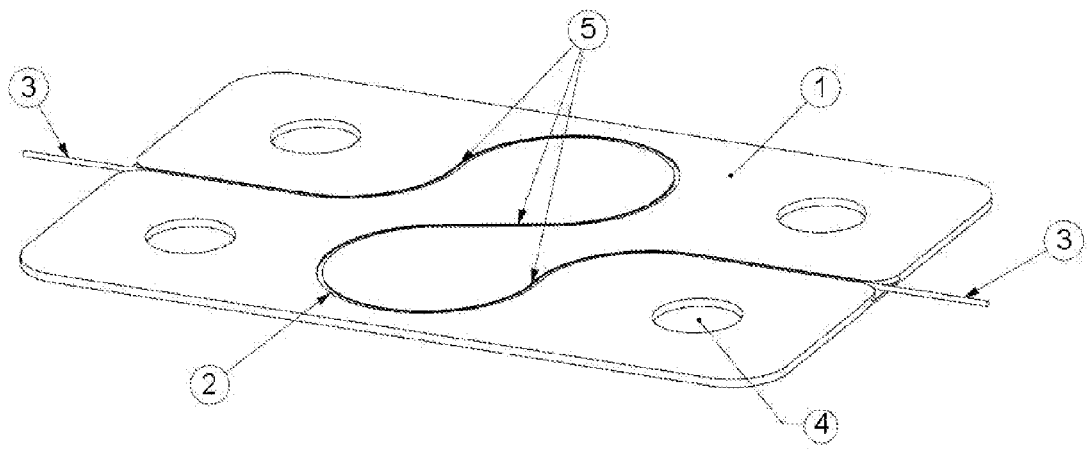
FIG. 2 shows an illustrative compact anchoring method utilizing a groove sized to tightly fit the buffer-coated fiber in the form of a 'serpentine' in a single plane employing at least one point of inflection in its path, in which the fiber can be fixed with the application of a simple adhesive in the groove.
Figure 2A:
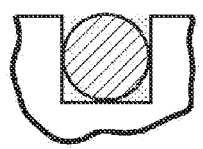
FIGS. 2a-2i show example substrate channel arrangements for capturing an optical fiber.
Figure 2B:
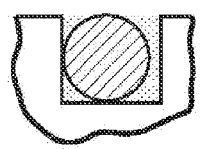
Figure 2C:
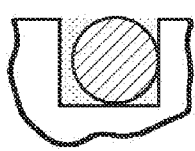
Figure 2D:
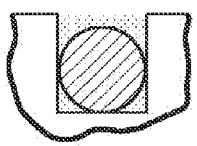
Figure 2E:
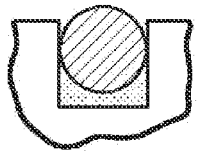
Figure 2F:
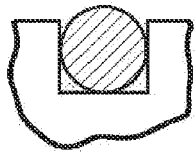
Figure 2G:
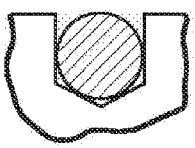
Figure 2H:
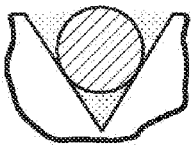
Figure 2I:
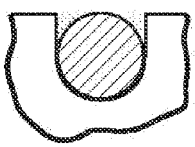

FIG. 2 is a non-limiting illustration of an optical fiber anchor in which an optical fiber 3, comprised of the glass fiber plus its buffer coating, is wound in a compact 'serpentine' form into a closely confining groove 2 in a plate 1 that then can be robustly attached to another body, in a non-limiting example, by bolts or other fasteners through holes 4. In this configuration, the fiber can be fixed into the groove for example, by a commonly available and inexpensive adhesive such as an epoxy. To continue this non-limiting example, if the radius of the loops is 4 mm, a bound length of about 48 mm can be provided in an axial length of about 15 mm. Further, the fiber will not creep as easily around the points of inflection 5 as it would if the winding were in one direction only, and the closely confining walls of the groove also restrain the amount of fixative required and thus any deleterious effects due to the adhesives' mechanical stiffness and expansion coefficient. The number of serpentine bends can be increased by stacking the serpentines in the third dimension without paying a penalty in the dimensions in the plane of the stress measurement, keeping the utility of a small form factor.

The serpentine groove or trough 5 recessed into plate 1 is dimensioned to accept and tightly retain buffer coated optical fiber 3 without permitting it to vibrate, slip or otherwise move in an undesired manner. Since conventional adhesive may be used to adhere fiber 3 into the groove, the groove 5 is desirably cut or otherwise formed with a width that is only larger than the cross-sectional diameter of the optical fiber 3 by the minimum required or desired adhesive thickness for best adherence and strength. In one example implementation, the groove is cut to be U-shaped, V-shaped or rectangular in cross-section to accept the cylindrical optical fiber 3 without any portion of the optical fiber extending above the plane of the plate 1 upper surface, and in some instances providing sufficient clearance so that bonding adhesive can be uniformly applied to the bottom of the groove. See FIGS. 2a-2i for some illustrative non-limiting examples.

Optical fibers are made with several different glass dimensions. Common optical fiber cladding diameters include 80 µm, 125 µm, 140 µm and 230 gm. Buffer coatings add more variability, although many are standard in a particular industry. While plate 1 is shown to be substantially planar in this illustration, it need not be flat but could be itself be a curved 3 D surface of any of a variety of geometries.

Figure 3A:
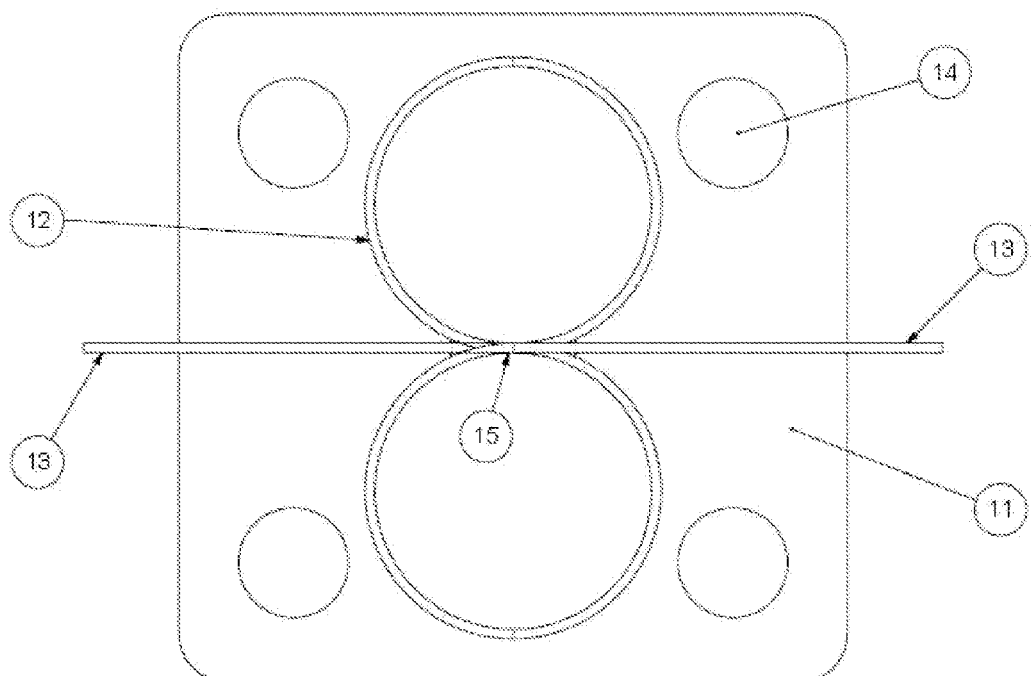
FIGS. 3a and 3b respectively show elevated and side views of an illustrative compact anchoring method utilizing a groove sized to tightly fit the buffer-coated fiber in the form of a 'bow tie serpentine' in which the fiber is wound in three dimensions, employing at least one point of inflection in its path, in which the fiber can be fixed.
Figure 3B:
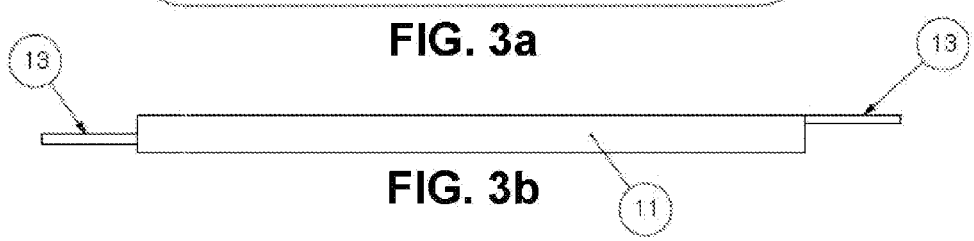

FIGS. 3a and 3b are non-limiting illustrations of an optical fiber anchor in which an optical fiber 13, comprised of the glass fiber plus its buffer coating, is wound in a compact 'bowtie serpentine' form into a closely confining groove 12 in a plate 11 that then can be robustly attached to another body, in a non-limiting example, by bolts or other fasteners through holes 14. In this configuration, the fiber can be fixed into the groove for example, by a commonly available and inexpensive adhesive such as an epoxy. In this non-limiting example, if 1 the radius of the loops is 4 mm, a bound length of about 48 mm with one loop on each side can be provided in a length of about 8mm, and multiple loops can be stacked without penalty to the lateral 'footprint'. Further, the fiber will not creep as easily around the points of inflection 15 as it would if the winding were in one direction only, and the closely confining walls of the groove also restrain the amount of fixative required and thus any deleterious effects due to the adhesive's low Young's modulus and high expansion coefficient.

Figure 4A:
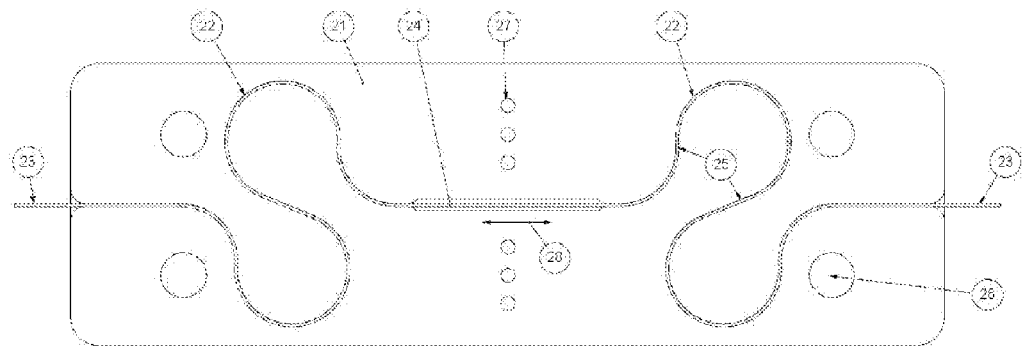
FIGS. 4a, 4b and 4c show different views of two illustrative compact anchor structures on either end of a fiber section containing at least one FBG to form a compact strain sensor.
Figure 4B:
Figure 4C:

FIGS. 4a-4c are non-limiting illustrations of an optical fiber strain sensor utilizing two serpentine anchors in a thin plate. The groove 22 can, as a non-limiting example, be mechanically machined into the plate 21 and, also as a non-limiting example, the fiber can be fixed in place with an epoxy. The optical fiber 23 in FIG. 4a contains at least one fiber Bragg grating in the section 24 for which the groove is wider and deeper than in the anchor sections and contains no adhesive, so the section 24 is free of the plate and can freely expand and contract in the directions 28, thus eliminating any possibility of the FBG reflection peak distorting due to gradients of strain or temperature along its length. In this non-limiting example, the plate 21 can contain mounting holes 26 and holes or some other structure 27 to reduce the force necessary to strain the plate.

Figure 5A:
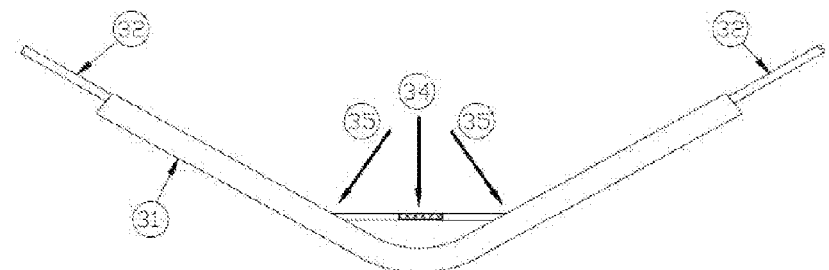
FIGS. 5a, 5b and 5c show different views of an illustrative, novel method of pre-stressing an optical fiber section containing at least one FBG for the purpose of providing compressive as well as tensile strain signals, without allowing the fiber to buckle in compression, in a plate incorporating a serpentine anchor on either side of the FBG.
Figure 5B:
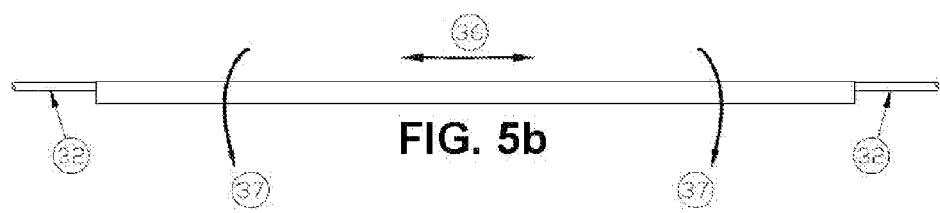
Figure 5C:
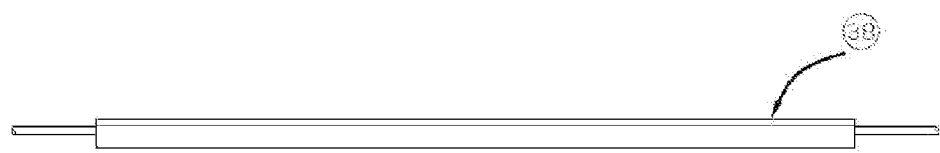

FIGS. 5a-5c are non-limiting illustrations of a method of applying an initial positive strain (stretch) of the example FBG 34 in order to provide a means of measuring compressive strain without buckling the fiber. This method is especially applicable to sensors with serpentine anchors on both sides of the FBG, all contained within a single body or plate. Shown in cross section in FIG. 5a, the fiber 32 is fixed into plate 31 while the plate 31 is bent in a 'V' shape and the section containing the FBG 34 is held straight across the vertex of the 'V' by means of clamps 35 (not shown for simplicity). As shown in FIG. 4b, also in cross section, the plate 31 is straightened, as shown by motion 37. The initial strain and intended operational strain measurement directions are shown by arrow 36. A lid 38 can then be optionally applied as shown in FIG. 5c in order to protect the FBG from damage.

Figure 6A:
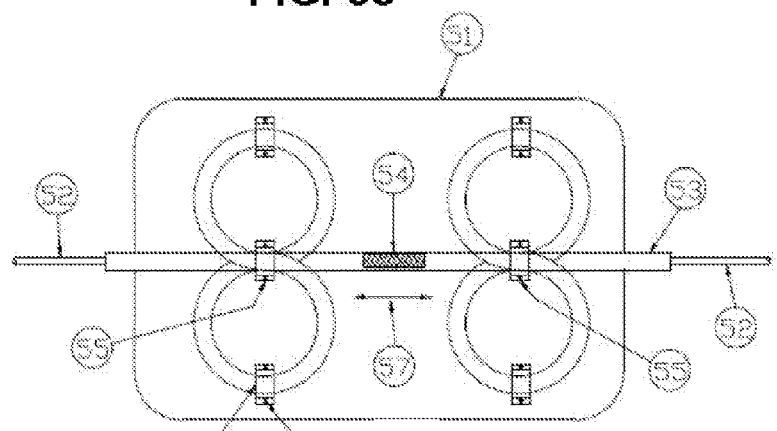
FIGS. 6a and 6b show different views of an illustrative compact strain sensor utilizing a tight-fitting tube to encase the buffer-coated fiber that contains at least one FBG in the center, wound at either side of the FBG in the form of a 'bow tie serpentine path', the tubing in turn being fixed to a plate, either on the surface or into a groove, in order to stabilize the tubing from unwanted drift in the optical fiber path shapes or dimensions.
Figure 6B:
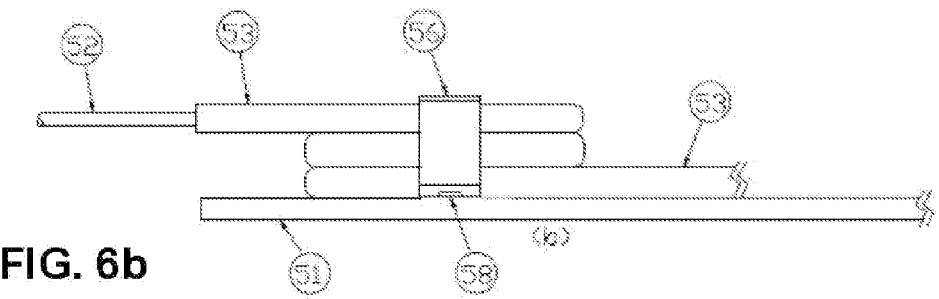

FIGS. 6a and 6b are non-limiting illustrations of a method of forming a close fitting tube 53 containing optical fiber 52 containing at least one FBG 54 into bow tie serpentine anchors and fixing said bow tie anchors to a plate or foil 51 to make a strain sensor. The bow tie anchors are made, in this non-limiting illustration FIG. 6a, by forming the tubing 53 around forms and then fixing the anchors to the plate 51 via brackets 56 that can non-exclusively be laser or spot welded to plate 51. FIG. 6b is an elevation view of one anchor of FIG. 7a.

Figure 7A:
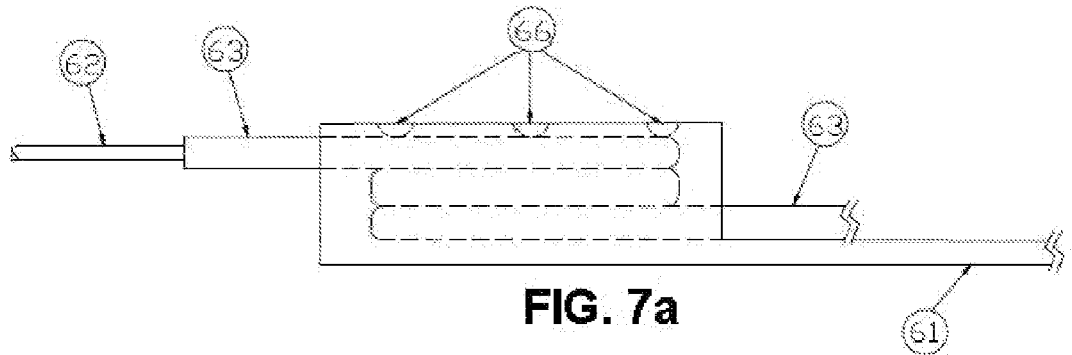
FIGS. 7a and 7b show different views of an illustrative compact anchoring method utilizing a high tensile strength, tightly fitting tube to encase the buffer-coated fiber, further formed into a compact 'bow tie serpentine path' configuration and further fixed into a groove cut into a block to stabilize the tubing and fiber bends. Said anchor structure further including a means for attaching it to a body in which strain is to be measured.
Figure 7B:
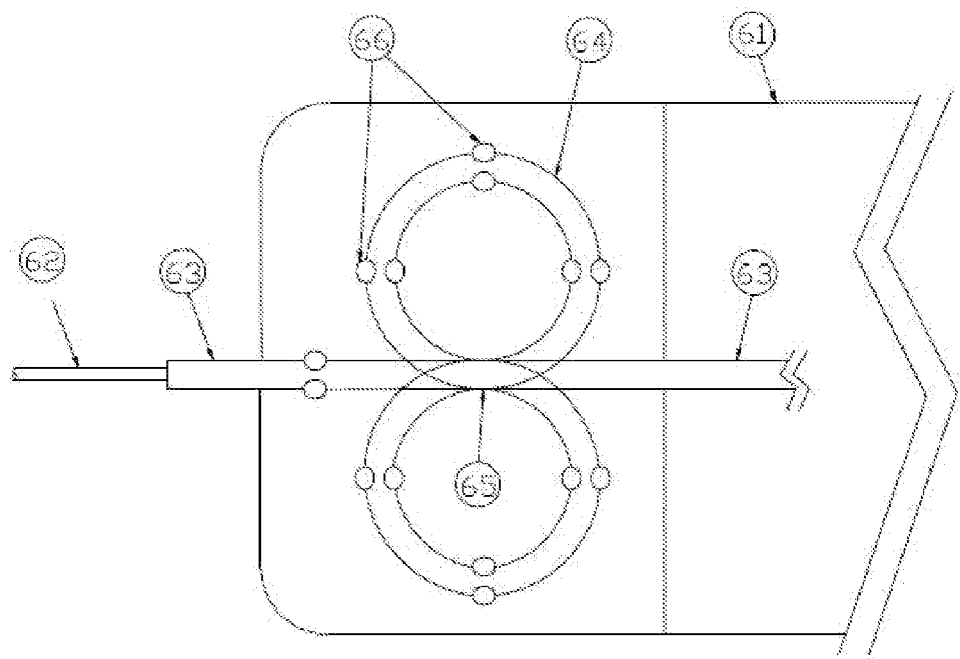

FIGS. 7a and 7b are a second non-limiting illustration of a second method of forming an anchor from tubing 63 containing a bonded fiber 62 further containing at least one FBG by winding said tubing into groove 65 in thicker ends of plate 61, followed by staking 66 the edges of groove 65 to prevent the tubing from slipping in the groove 65. Plate 61 can be further modified to reduce its resistance to tensile or compressive forces and thus increase the sensitivity of a strain sensor incorporating the herein-described anchors.

Figure 8:
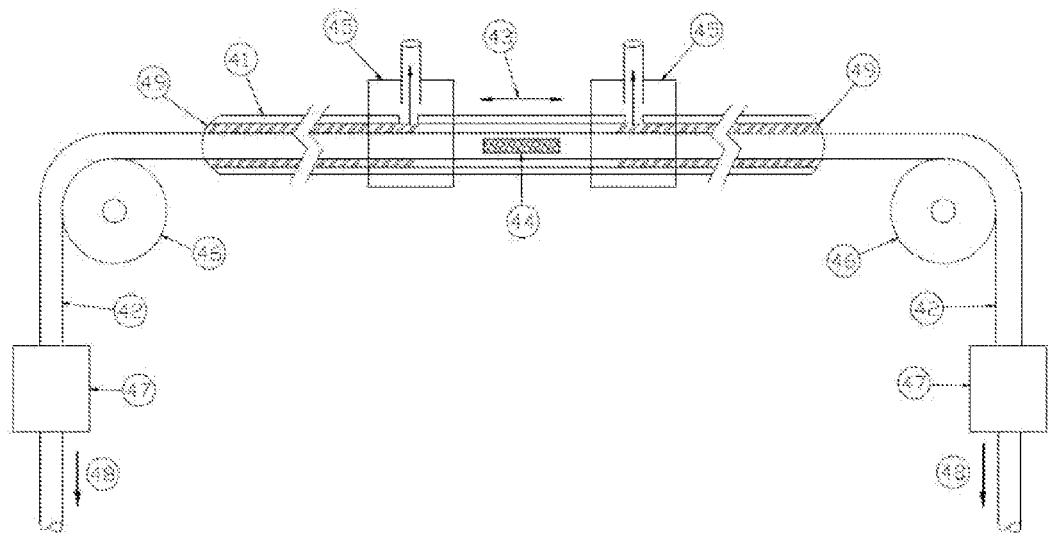
FIG. 8 shows an illustrative method of pre-stressing an optical fiber containing an FBG for the purpose of providing compressive as well as tensile strain signals, without buckling the fiber in compression, in a close fitting tube, before winding the ends of the tube into serpentines as in FIGS. 6 and 7.

FIG. 8 is a non-limiting illustration of a method of confining an optical fiber 42 in a closely fitting tube 41, as a non-exclusive example, hypodermic needle tubing, with the dual objective of bonding a pre-stretched fiber in the direction of the strain to be measured 43, preliminary to forming the tubing into anchors at each end of a strain sensor, as in FIGS. 6 and 7. The non-limiting method illustrated in FIG. 8 is to use pulleys 46 to apply the pre-stretch by means of gravity (in the direction of arrows 48) and weights 47. Fixing the fiber in the tube can, as a non-exclusive example, be achieved by placing a pool of an adhesive at each end of the tube 49 around the fiber and using vacuum to cause the adhesive to infiltrate to the positions of the vacuum collets 45, thus leaving the FBG 44 free of the adhesive. When cured, the adhesive holds the FBG 44 in the pre-stretched condition. The process of wrapping the tubing into a serpentine anchor structure can be utilized to further pre-stress the FBG.

Figure 9:
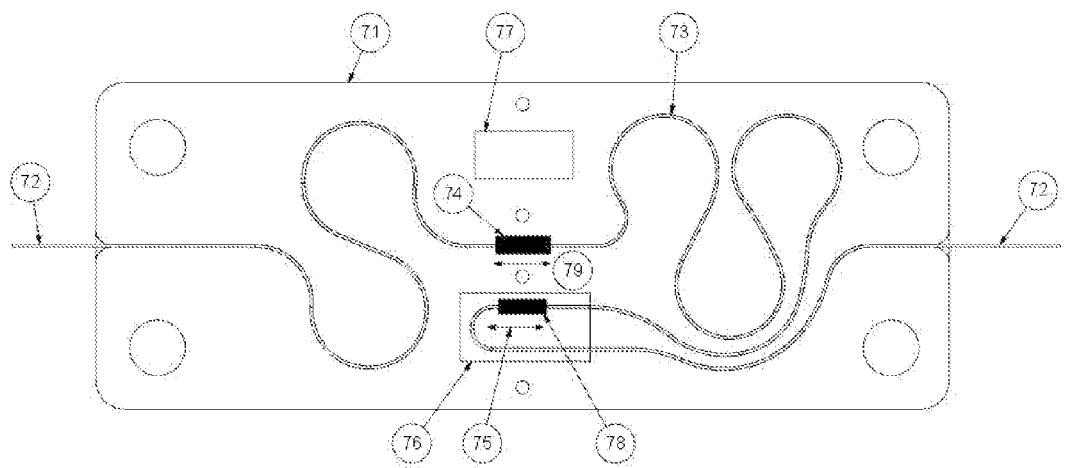
FIG. 9 shows an illustrative method of fabricating a dual strain and temperature sensor utilizing at least two fiber Bragg gratings in which the strain sensing grating is anchored at both ends and the temperature sensing grating is strain-free mounted in a cavity sufficiently large to prevent the FBG from rubbing or catching on the cavity walls.

FIG. 9 is a non-limiting illustration of a strain sensor formed of a plate 71 containing 1 an optical fiber 72 in closely confining groove 73, further containing at least one FBG 74 positioned to measure strain in the directions 79. FBG 74 is anchored by two serpentine anchors to prevent creep of the anchored fiber under stress. A further FBG 78 is contained in a strain1 free manner in cavity 76, free of contact with the walls of the cavity 76. Said further FBG 78 can be used to measure temperature free of the effects of strain experienced by FBG 74 in order to provide independent temperature compensation, since FBG 74 is affected by both temperature and strain. The fiber loop containing FBG 78 effectively anchors the FBG at only one end. The fiber loop maintains a continuous fiber and is further free to move in direction 75 with the expansion and contraction of the plate 71, without contacting the cavity walls and without being strained by the plate. A second cavity 77 can be used to balance the symmetry of the strain sensor's mechanical response to stress.

Figure 10:
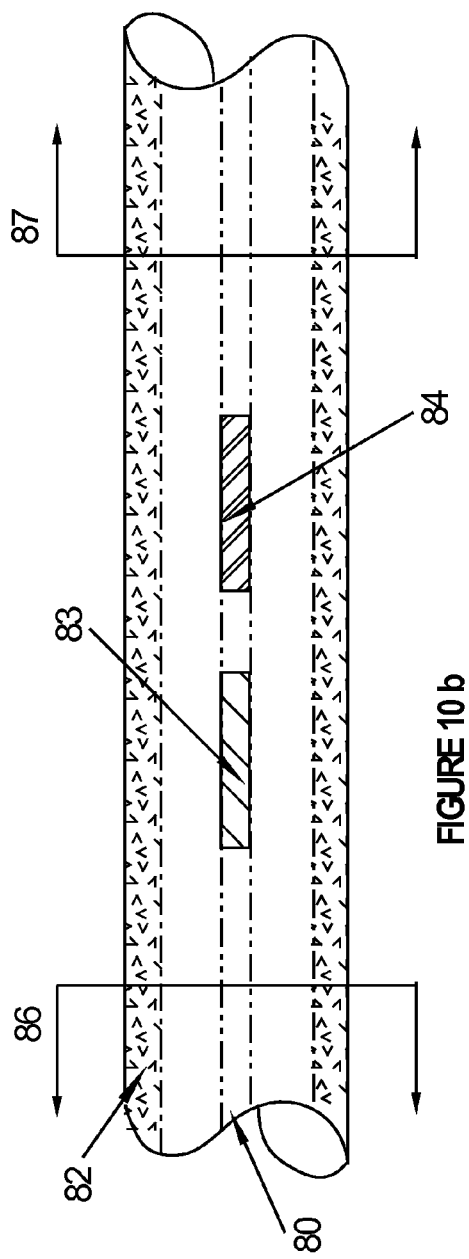
Figure 10:
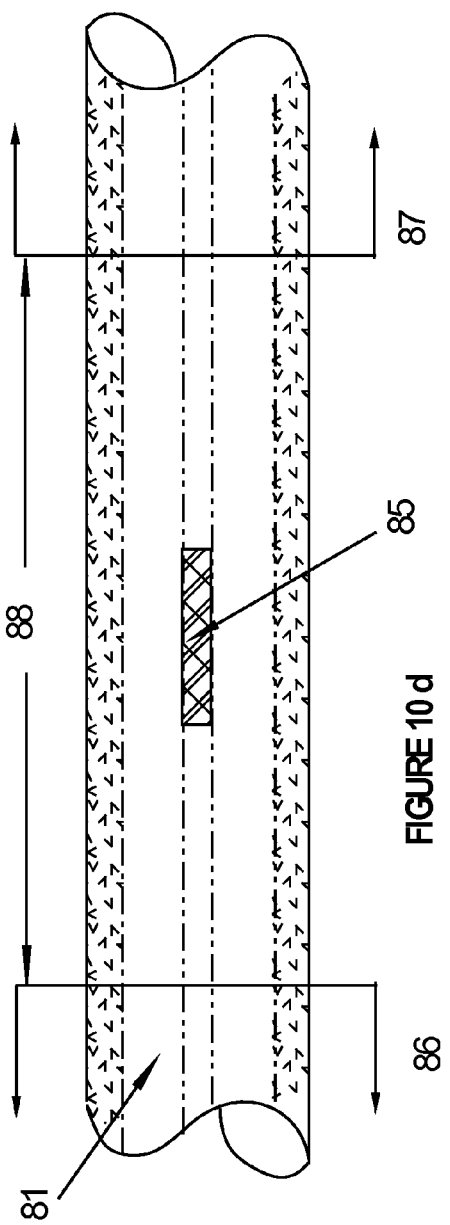
Figure 10:
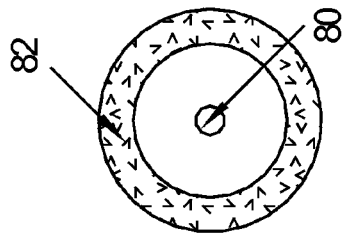
Figure 10:
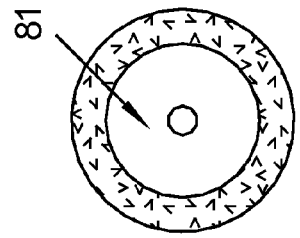

FIG. 10 is a non-limiting illustration of a dual function strain and temperature sensor utilizing two FBGs inscribed in the straight, non-adhered section (24 in FIG. 4a) of the sensor casing either physically separate from the first FBG or even in the same location as the first FBG if the properties of the two FBGs, such as center wavelength, are different enough that the signals from each can be resolved from the other and either or both the temperature and strain dependences of the two differ significantly. In this case, the strain-optic and thermo-optic coefficients of the two FBGs can be utilized with two equations in two unknowns and the strain and temperature can be separately derived.

FIG. 10 illustrates the utilization of the unique properties of FBGs to separate strain and temperature signals within the same sensor body or casing. The optical fiber has at least one core 80 with at least one optical cladding 81 substantially surrounding it with its main purpose to confine light to the core and at least one protective coating or buffer coating 81 that may or may not have an optical function. FIG. 10b includes at least two FBG structures 83 and 84 possessing differing strain and/or temperature responses inscribed in the fiber core in two non-overlapping physical locations. In this illustration, the length of fiber 88 is free of any bond to the casing similar to feature 24 of FIG. 4, but the fiber is anchored to the casing outside the length 88 in the directions of the arrow 86 and 87. FIG. 10d illustrates the utilization of the self-optical-filtering properties of FBGs to allow them to be inscribed in the same physical location if their reflection bands are separated enough in wavelength for the peaks to be detected separately.

Figure 11A:
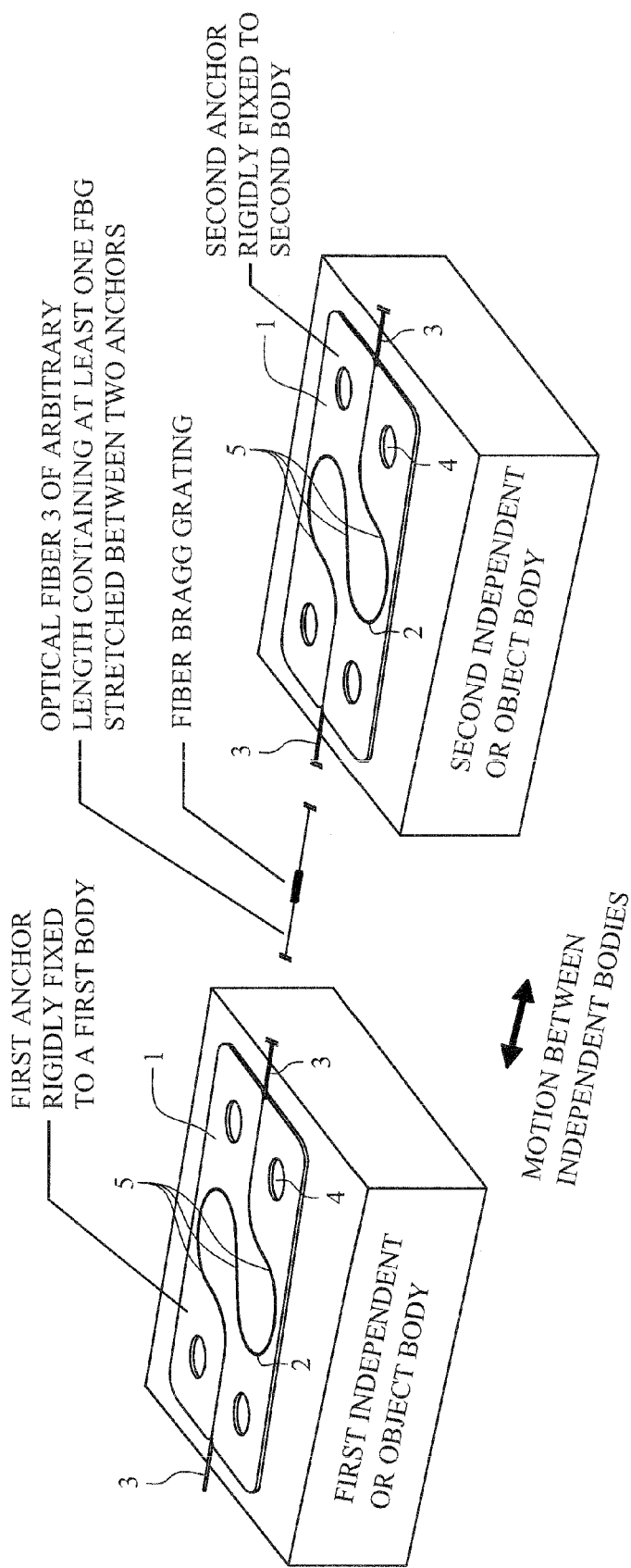
FIGS. 11a and 11b show different views of two illustrative compact anchor structures attached to two different bodies.
Figure 11B:
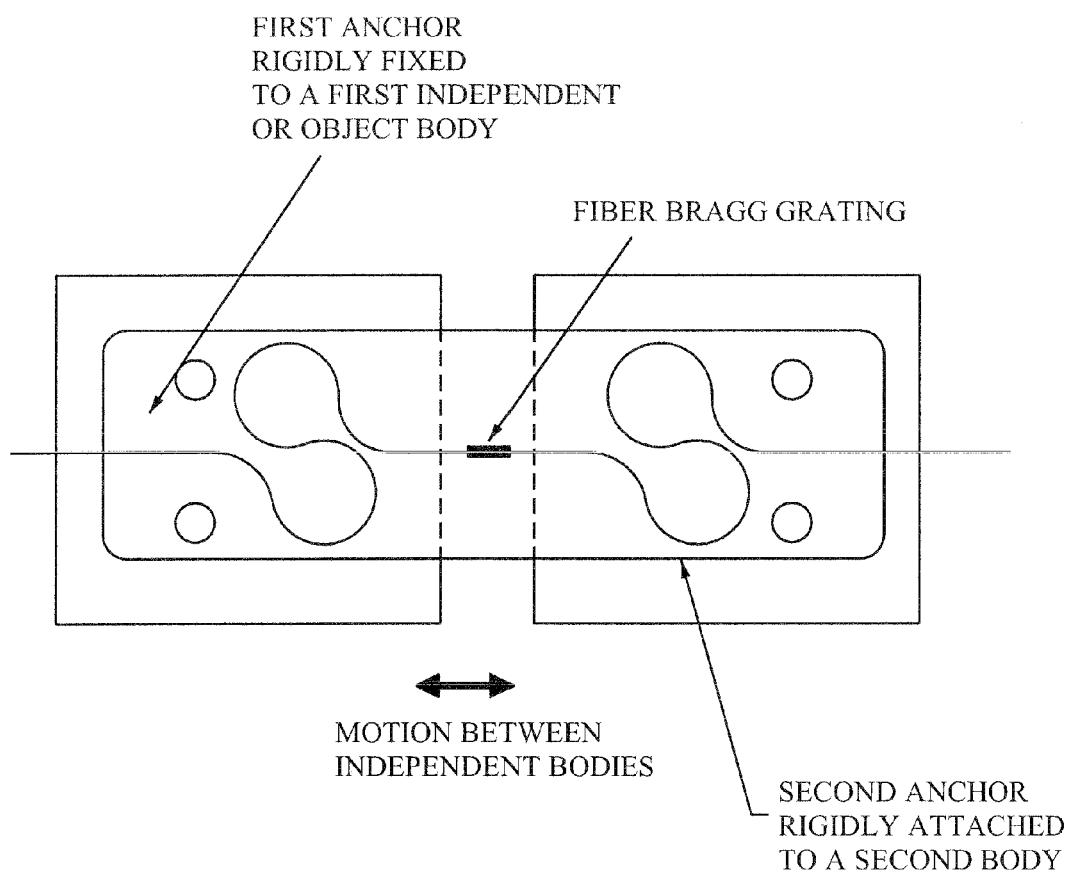

FIGS. 11a and 11b show an optical fiber optic sensor comprising two anchor structures, each attached to a separate independent body. The motion between the two independent bodies can be measured via the FBG disposed in an optical fiber 3 stretched between the two anchor structures. FIG. 11a is a nonexclusive, exemplary illustration of two separate anchor casings attached each to an independent body with an arbitrarily long length of optical fiber between them that is not enclosed in either anchor structure. The arbitrarily long length of optical fiber contains at least one fiber Bragg grating. FIG. 11b is a nonexclusive, exemplary illustration of a single casing as in FIG. 4a, the single casing including two anchors with at least one fiber Bragg grating between them. Each anchor section is attached to a different independent body in order to measure the motion between the independent bodies by means of the strain on the fiber Bragg grating.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A fiber optic strain sensor comprising:
    at least one optical fiber composed of at least one core and at least one cladding around the core or cores to substantially confine light to the core or cores,
    at least one buffer layer further surrounding the outermost cladding layer of said core or cores and bonded to said outermost cladding layer,
    at least one fiber optic sensing area within said optical fiber comprised of at least one of a fiber Bragg grating, Fabry-Perot or interferometric optical structure configured to sense strain,
    at least two low-creep anchor structures bracketing said at least one fiber optic sensing area,
    a provision for attaching each anchor structure of said fiber optic strain sensor to at least one independent body, the strain in which is to be measured, and
    a provision for attaching each anchor structure of said fiber optic strain sensor separately to two other bodies, the movement between which is to be measured.

2. The fiber optic strain sensor of claim 1 in which the optical fiber structure is subjected to an axial pre-stressing method before bonding to at least the second of said two anchor structures.

3. The fiber optic strain sensor of claim 1 further comprising a second, strain-free mounted sensing element constructed within the strain sensor structure to temperature compensate the strain sensor.

4. The fiber optic sensor of claim 1 wherein at least a fiber optic sensing area and one anchor structure are suspended free of anchoring to any other body for use as a temperature sensor.

5. The fiber optic strain sensor of claim 1 further comprising two fiber Bragg gratings inscribed in the optical fiber in the same fiber optic sensing area and further both housed in an unbonded section of the strain sensor, the temperature or strain characteristics of the two fiber Bragg gratings are different and two equations in two unknowns can be solved to yield separate and accurate values of temperature and strain in the optical fiber containing the two fiber Bragg gratings.

* * * * *